July 8, 1924. 1,500,304
F. I. ELLIS ET AL
PIPE MILL
Filed Dec. 11, 1920  6 Sheets-Sheet 1

WITNESSES
J. Herbert Bradley.
Francis J. Tomasson

INVENTORS
Frank I. Ellis
John H. Sennett
by Christy and Christy
attorneys

July 8, 1924.

F. I. ELLIS ET AL 1,500,304

PIPE MILL

Filed Dec. 11, 1920

6 Sheets-Sheet 2

WITNESSES

INVENTORS
Frank I. Ellis
John H. Sennett
by Christy and Christy
their attorneys

July 8, 1924.

F. I. ELLIS ET AL

PIPE MILL

Filed Dec. 11, 1920

1,500,304

6 Sheets-Sheet 3

WITNESSES

INVENTORS
Frank I. Ellis
John H. Sennett
by Christy and Christy
their attorneys

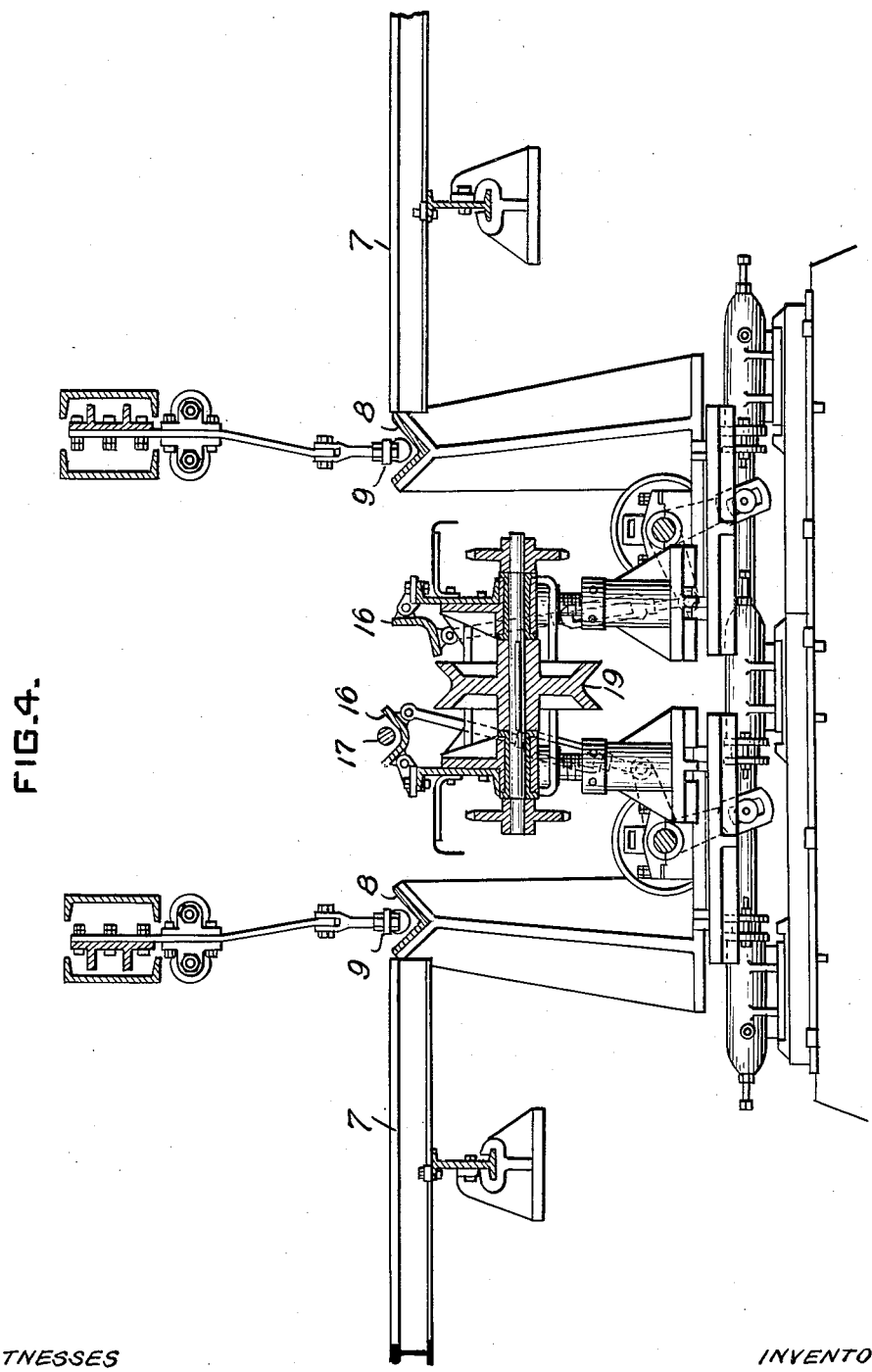

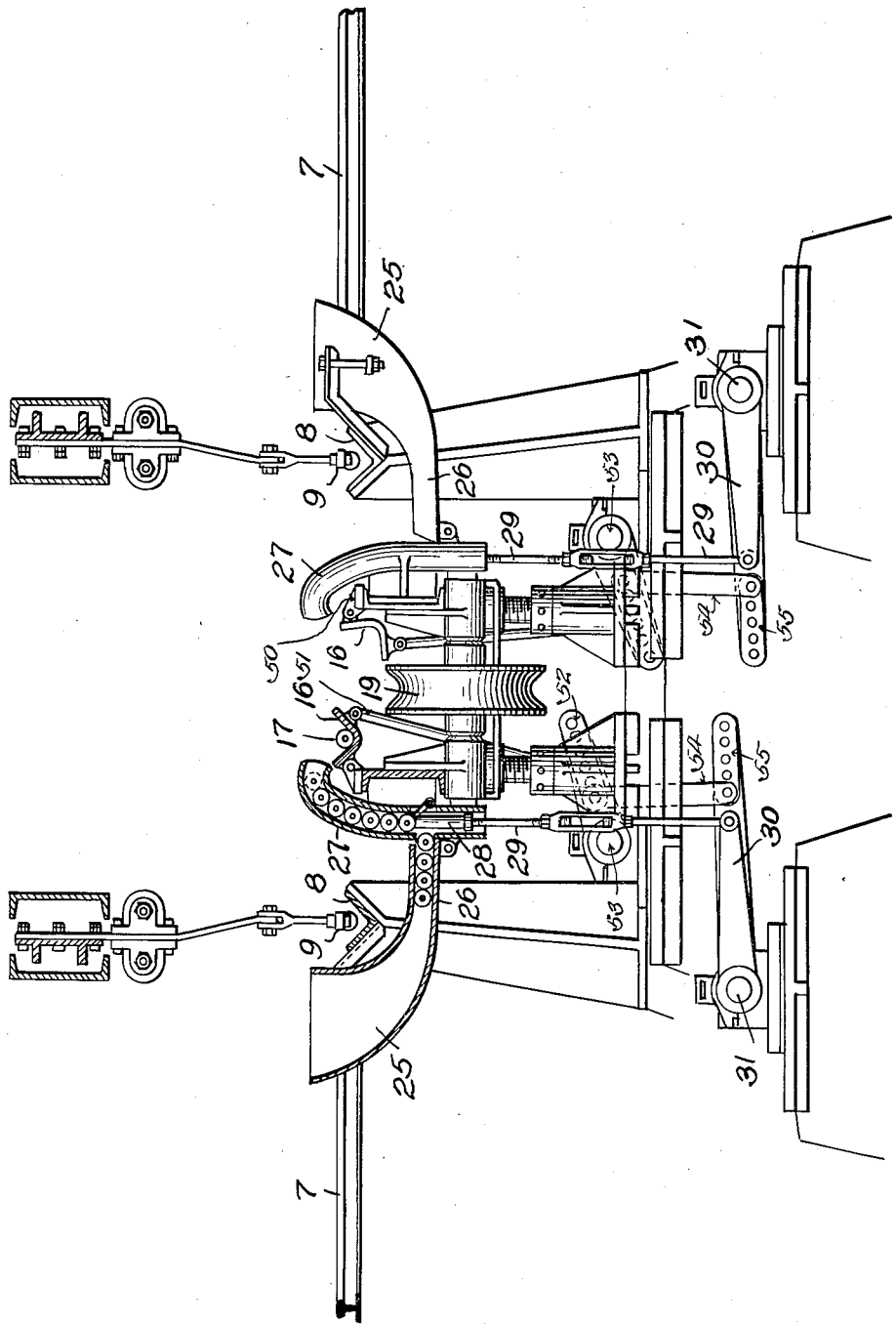

July 8, 1924.  1,500,304
F. I. ELLIS ET AL
PIPE MILL
Filed Dec. 11, 1920   6 Sheets-Sheet 6
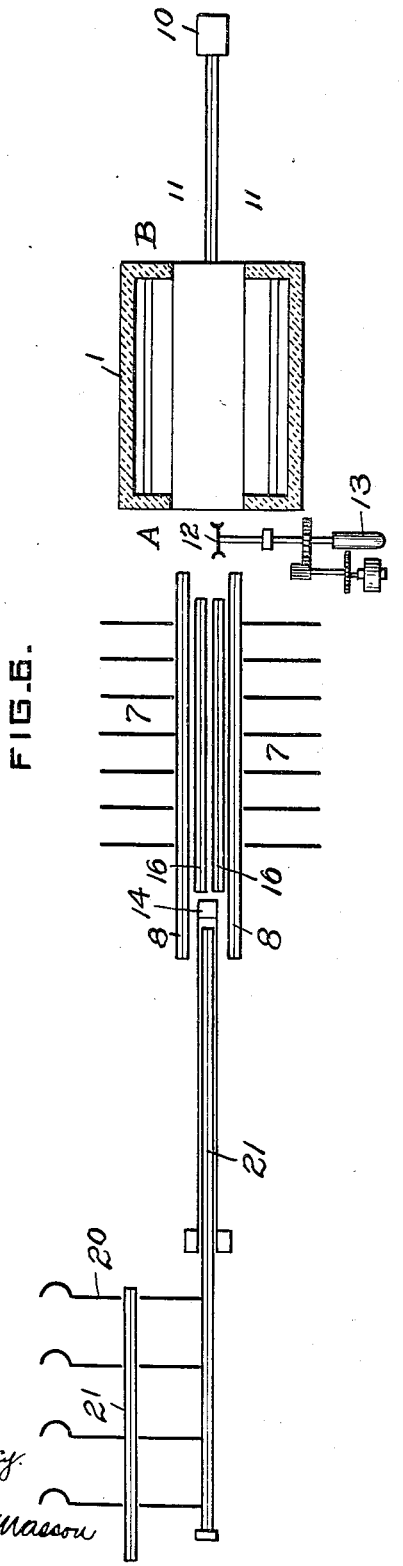
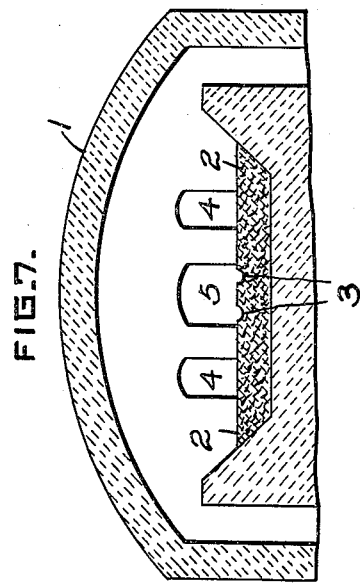
INVENTORS
Frank I. Ellis
John H. Sennett
by Christy and Christy
their attorneys Patented July 8, 1924.

1,500,304

UNITED STATES PATENT OFFICE.

FRANK I. ELLIS, OF PITTSBURGH, AND JOHN H. SENNETT, OF WOODLAWN, PENNSYLVANIA, ASSIGNORS TO JONES & LAUGHLIN STEEL COMPANY, OF PITTSBURGH, PENNSYLVANIA, A CORPORATION OF PENNSYLVANIA.

PIPE MILL.

Application filed December 11, 1920. Serial No. 429,853.

*To all whom it may concern:*

Be it known that we, FRANK I. ELLIS, residing at Pittsburgh, in the county of Allegheny and State of Pennsylvania, and JOHN H. SENNETT, residing at Woodlawn, in the county of Beaver and State of Pennsylvania, both citizens of the United States, have invented or discovered certain new and useful Improvements in Pipe Mills, of which improvements the following is a specification.

Our invention relates to improvements in pipe mills, particularly in mills for welding pipe, and consists in such a construction and arrangement of the machine units which go to make up the mill assembly as to effect economy in operation. The invention has to do with the furnace in which the blanks—that is to say, the skelp, bent to pipe formation, but with edges still unwelded—are heated, preparatory to introduction into the welding machine, and with the machine units which stand in immediate association with this heating furnace—including, of course, the just-mentioned welding machine. The invention has been developed in a mill for lap-welding, but is applicable wherever the same problem presents itself.

Figure 1:
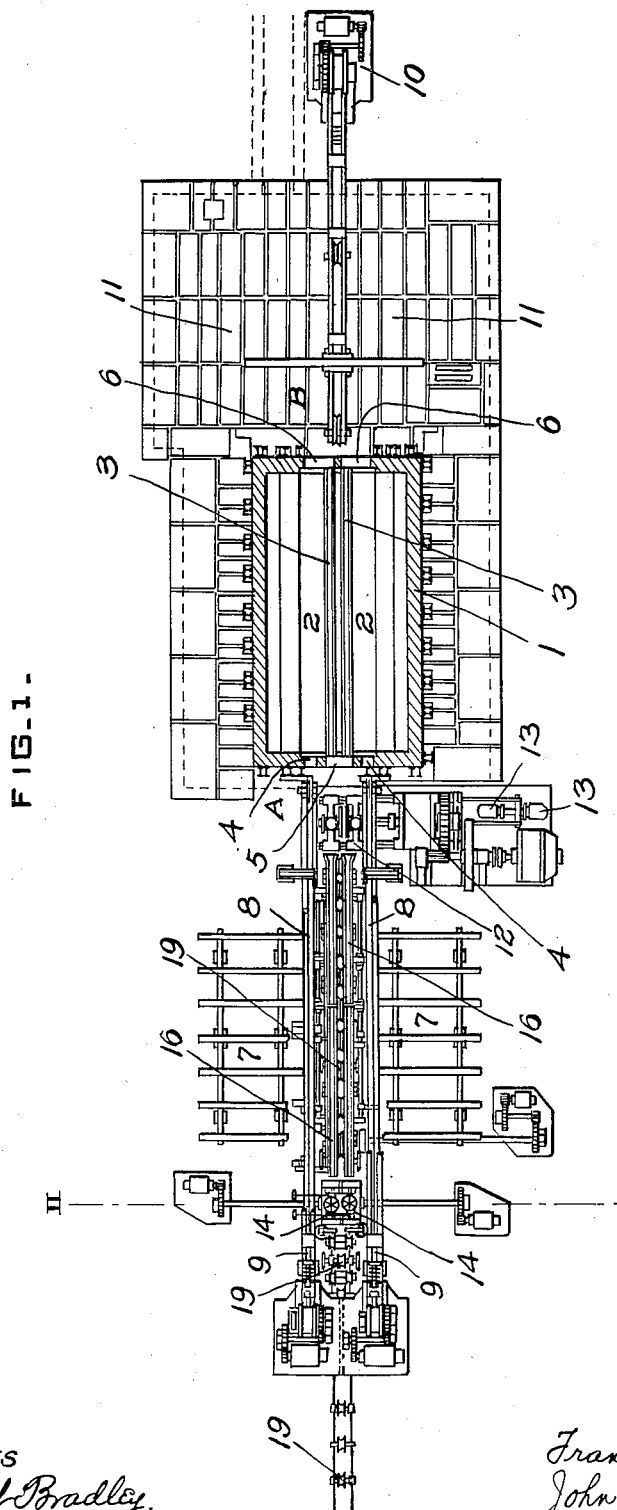
Figure 2:
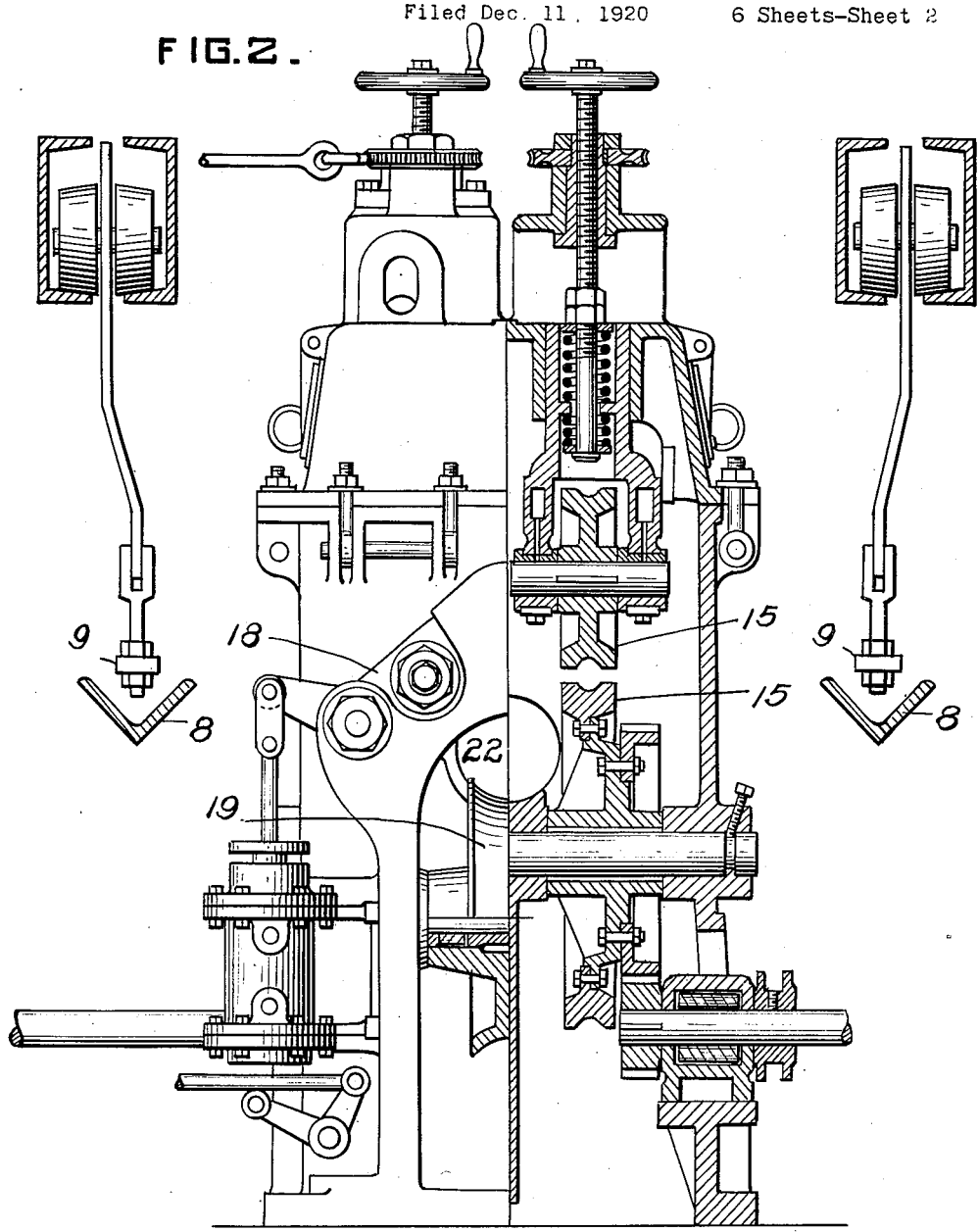
Figure 3:
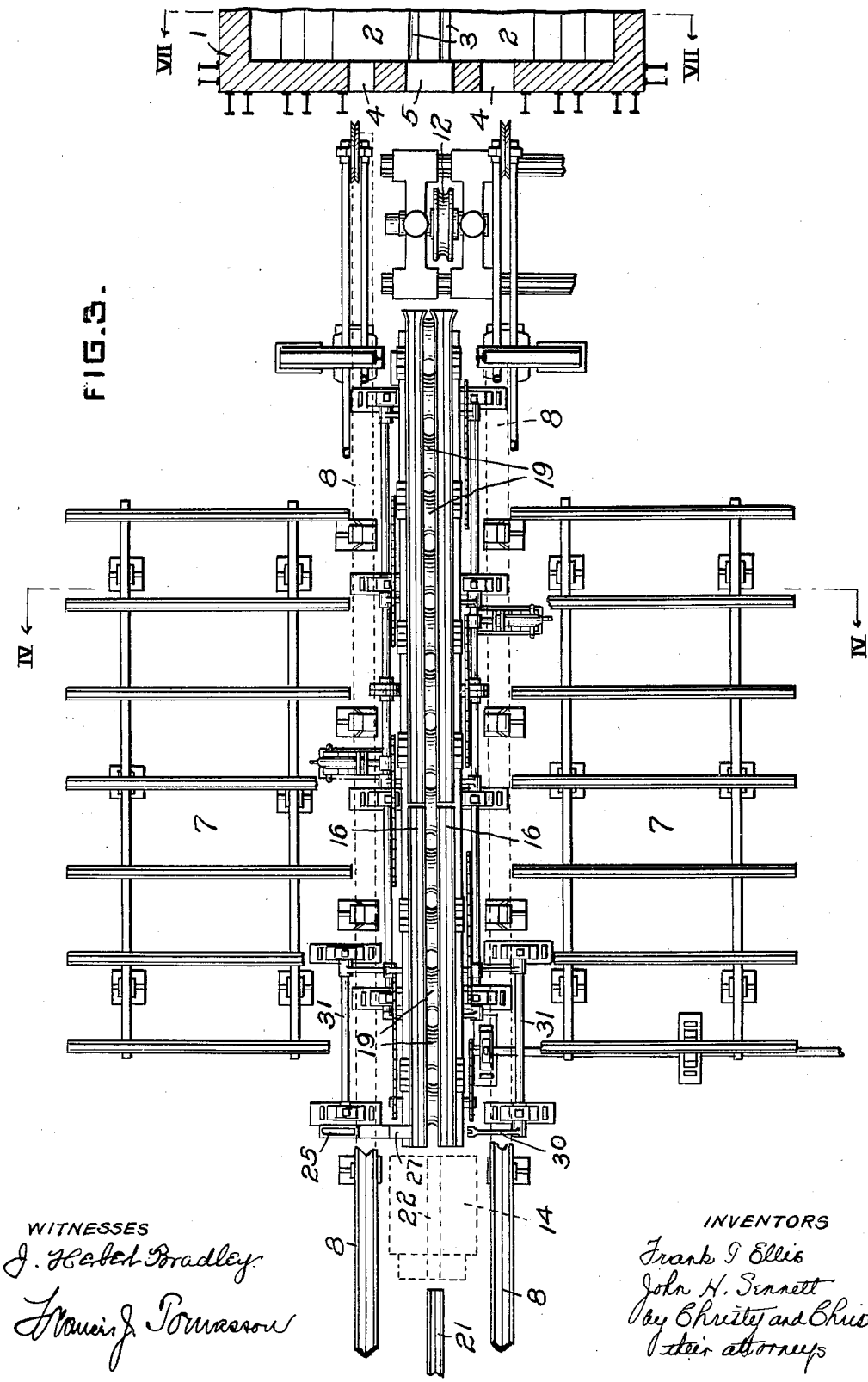

The invention is illustrated in the accompanying drawings. Fig. 1 is a view partly in plan, partly in horizontal section; the heating furnace is shown in section, the immediately associated machine units in plan. Fig. 2 is a view to larger scale, partly in section on the plane indicated by the line II—II, Fig. 1, and partly in end elevation, viewed from the left, Fig. 1. Fig. 3 is a view to larger scale, and with the inclusion of added details, of a portion of what is shown in Fig. 1. Fig. 4 is a view in section, on the plane indicated at IV—IV, Fig. 3. Fig. 5 is a view in end elevation (viewed from the left), and to somewhat larger scale, of a portion of the assembly shown in Fig. 3—certain details being shown in vertical section. Fig. 6 is a diagrammatic view of a portion of what is shown in Fig. 1. Fig. 7 is a view in cross section through the furnace, the plane of section being indicated by the line VII—VII, Fig. 3.

The heating furnace is indicated at 1. It is of usual construction: the hearth is rectangular, and of such length as to receive the blanks fed to it. (The blanks, as has already been indicated, are the skelp, shaped for welding, but not yet welded.) The hearth of the furnace here shown is a double or twin hearth, the two sides alike, and symmetrically disposed with respect to the middle line of the furnace. This hearth then includes two lateral table-like areas 2, and two medial gutters 3 interrupting the continuity of the table-like areas and extending side by side, in close proximity one to the other, and on either side of the medial line of the furnace.

Into this furnace, and alternately, first on one side and then on the other, the blanks are pushed longitudinally. On entering they rest initially on the table-like portions 2 of the furnace hearth, and resting there they become heated in the manner and to the degree requisite for welding. From the table-like portions 2 the blanks are rolled into the gutters 3, and from gutters 3 they are pushed out longitudinally. Emerging from the furnace, they enter immediately the welding machine, which is the next machine unit of the mill assembly. Referring to Figs. 1 and 6 of the drawings, it is to be remarked, first, that the blanks enter and leave the furnace 1 at the same end. This, as will in the sequel appear, is a departure from the usual practice, and is one element of invention; ordinarily in a mill assembly of this sort, the blanks are pushed in at one end of the furnace and out at the other. As here appears, A is the end of the furnace through which the blanks enter and leave. The end wall at the end A is interrupted by openings; two lateral openings 4 are in line with the table-like portions 2 of the hearth along their outer margins, a single central opening 5 is arranged opposite, and is of sufficient width to extend across the ends of both of the gutters 3. The opposite end wall at the end B of the furnace is interrupted by two relatively wide openings 6, symmetrically arranged, each extending across both table 2 and gutter 3 on one side of the furnace; and these openings 6 are separated by a medial pier which in width does not exceed the space between the two gutters 3.

Adjacent the furnace, at the end A, and on either side of the medial line, are feed tables 7. The form which these tables take is unimportant; but, as shown, each consists of a number of rails extending side by side in a direction transverse to the line of furnace feed. Upon these rails a quantity of blanks may rest, the blanks lying parallel to the line of furnace feed, and along these rails the blanks may slide in a direction transverse to their length, one by one to the furnace feeding apparatus. This skidway is ordinarily inclined, at least toward its delivery end, and the blanks are ordinarily advanced manually to such gravity incline.

The feed tables 7 are two of the machine units alluded to already as entering into a collocation of parts, in which our invention resides. The next unit, in order of the advance of the material, is the charging machine, by which the blanks are advanced one by one into the furnace.

We pause in the course of description to remark that, while we show and describe a two-sided furnace, and duplicate associated machine units on either side the medial line, it will be understood that this twin-hearth arrangement is a matter of economy, and that our invention broadly regarded exists independently of it, and would remain even if the furnace and its associated pairs of machine units were cut in half. At the same time, in narrower aspect, the invention relates itself to the twin-hearth arrangement, as will presently more fully appear.

The charging machines consist essentially, each of a trough 8, extending opposite and in line with one of the furnace openings 4, and a pusher 9 impelled longitudinally in the trough. Pusher and means for impelling it are well known in the art; the means shown in the drawings (Figs. 2, 4, and 5) include carriers driven in overhead runways. But in this respect the showing is exemplary; our present invention does not concern the details of construction of these parts and further description of them is unnecessary. Suffice it to add that, at suitable intervals of time in the progress of mill operation, one of these pushers advances, and, engaging from behind a blank which has been rolled and slid down from table 7 and into trough 8, pushes it along the trough and into furnace 1, until it rests throughout its length on the table portion 2 of the hearth. The pusher then recedes and returns to position, ready to carry forward another blank.

The blank within the furnace is manipulated on the table-like portion of the hearth and rolled into the gutter 3 by an attendant, who stands at the end B of the furnace and has access to the blanks through one of the openings 6. This manual operation of rolling the blank from the table portion 2 into the gutter 3 is called "turning down," and the attendant is called the "turndown."

From furnace 1 the properly heated blanks are impelled longitudinally along one of the gutters 3, through opening 5 in the end wall of the furnace, and into the welding machine. A discharging machine is ordinarily employed, called a "pushout machine." It is indicated at 10; its particular construction does not enter into the essence of our invention; such machines are known; and we omit minute description of it. Indeed, the machine might be dispensed with, and the blanks pushed out by attendants—as is in some places common practice.

We show a single machine, adapted to drive blanks from either of the gutters 3. And, since the gutters 3 are arranged side by side, at a slight interval apart, suitably adapted pusher apparatus driven by a single stationary machine 10 may operate through the openings 6, and drive a blank along either of the gutters.

This discharging apparatus requires no wide range of lateral play, across the end B of the furnace. And accordingly free floor spaces 11, 11 remain on either side of the discharging apparatus, where attendants may stand, undisturbed in their position, and tend the blanks within the furnace.

This, as will presently appear, is an advantage consequent upon our invention, and from which flows substantial economic gain. If there be no machine 10, the whole space at the end B of the furnace is free to the turndowns and the welders.

At the further end of the furnace, opposite the discharging apparatus, the end A, is the welding machine 12. It consists essentially of a pair of welding rolls, properly mounted and driven. This machine has a range of lateral translation, permitting it to be moved and brought to either of two alternate positions with its roll pass aligned with either of the troughs 3 in the hearth of furnace 1. It should also be remarked that this welding machine stands close against the end A of furnace 1, so that the blanks advancing from the furnace enter at once the roll pass of the welding machine. It is because of the arrangement of the troughs 3 adjacent one another near the middle line of the furnace that sufficient space is found between troughs 8 for the arrangement of and the operation of this laterally movable welding machine. Suitable means may be provided for the periodic shifting of the welding machine, such, for example, as the hydraulic cylinders 13. And it will of course be understood that, to effect this movability, the welding machine itself will be mounted in suitable ways.

It will of course be understood that the possibility exists of providing two welding machines, one opposite the end of each gutter 3, and in that case the machine would stand immovable on their foundations.

Cooperating with the welding machine, and indeed forming part of it, is the machine which at the proper moment brings to position in the pass of the welding rolls a welding ball, maintains the ball in position in the roll pass during the welding operation, and, again, at the proper moment in the cycle of operation, makes way for the delivery of the welded and thus far finished pipe.

The welding ball 17 is removably carried at the end of a bar of substantially the same length as the pipe under treatment—ordinarily the bar being somewhat longer than the pipe. This bar, armed with its ball, is impelled from a base arranged to rearward of (that is to say, on the delivery side of) the welding machine, at an interval exceeding the length of the pipe. When the welding operation upon a single length of pipe is completed, the ball falls from the end of the bar, the bar is retracted, and so the pipe is left free for further handling. When the thus far finished length of pipe is out of the way, the bar equipped again with a ball may be impelled forward again, for another welding operation.

The drawings show duplicate bar-driving machines, ordinarily called "bar pullers," 14, arranged one opposite each of the two gutters 3 in the furnace hearth, and spaced as has been said at a sufficient interval from the welding machine to allow a length of pipe to extend free between. Each bar puller consists essentially of a pair of suitably mounted and suitably driven bar-engaging rolls 15. A guide trough 16 is arranged between the welding rolls and the bar puller; this trough supports the advancing bar and receives the welded pipe as it issues from the rolls. Suitable abutments 18 are provided, adapted to be alternately brought to and removed from position in the line of bar travel, to hold the balls in the pass of the welding rolls and to sustain the thrust of the welding operation. More minute description of the bar puller is not requisite to an explanation of our present invention.

For the purpose of feeding the welding balls to the troughs 16 in advance of the bars which impel them to the roll pass of the welding machine, we provide the ball hoppers 25, one at each side of the machine, adjacent to the remote ends of the troughs 16. Each of these hoppers has an inwardly directed discharged throat portion 26 which opens into an upwardly and inwardly extending spout 27 whose upper end is arranged to discharge into one of the troughs 8. One of the hoppers 25 is removed in Figure 3, but both of them are shown in Figure 5, one of the hoppers 25 and spout 27 being in section, and the other in end elevation. The balls roll from the throat portion of each hopper into one of the spouts 27 above a vertically reciprocating plunger 28 which may be reciprocated by an adjustable connection 29 to the crank arm 30 of a rocker shaft 31. The shaft 31 may be suitably driven.

At another and preferably at a lower level than the lines of progress of the pipe from the welding machine, extends a conveyor, in this instance made up of a succession of grooved rollers 19 which may be driven in the well-known way. It extends from the delivery side of the welding machine and from a point between the welding machine and bar puller, in a direction parallel to the line of progress through the furnace and welding machine of the articles under treatment, indefinitely to the rear—that is in right to left direction, as seen in Figs. 1 and 6. Such a conveyor may lead directly to the next machine unit of the mill—and that unit, in usual mill practice, is a pair of sizing rolls. There may be an inspection table 20 between, as indicated in Fig. 6. The two reaches of conveyor leading to and from table 20 are, in Fig. 6, indicated at 21, 21. The conveyor, at the end adjacent the welding machine, extends parallel with and in immediate juxtaposition with trough 16; and, there being two troughs 16 in the particular mill assembly shown, extending side by side and closely adjacent one another, the conveyor extends between them on the medial line of the furnace. The troughs 16 are made to tip and to discharge the lengths of pipe laterally by gravity into the conveyor. This is possible because the conveyor is arranged, as has been said, at a lower level than the troughs. The tipping troughs and a suitable means for tipping them are shown in Figures 4 and 5. Each of the troughs 16 is pivotally supported at its outer edge by brackets 50 and at its inner edge is pivotally connected as by links 51 to crank arms 52 carried by shafts 53. Arms 52 are preferably connected by links 54 to crank arms 55 connecting the rocker shafts 31, already referred to, as shown in Figure 5. In this way the mechanism for tipping the troughs and that for feeding the welding balls to the troughs are so connected that when each trough in turn, after tipping to discharge its contained pipe, returns to its normal pipe-receiving position, the plunger 28 at that side will be actuated to force one of the balls out of the spout and into the trough as indicated on the left at Figure 5.

A further advantageous feature of construction, attainable in consequence of the fact that the conveyor extends at this different level, lies in this: The bar puller itself—in this case the foundation of the bar puller—may be formed with an opening 22, through which the pipe may be conveyed away longitudinally. It is this penetration of the bar puller, to allow for the longitudinal carrying away of the welded pipe, which makes possible the combination of the component machine units herein shown and described, and relieves that congestion in mill operation which, as stated above, has been an obstruction to smooth and speedy operation of the mill as a whole.

The chief advantage of our improved combination is that it affords free standing ground for the attendants—the "turndowns" and the welders—where they can work without interference and with undivided attention; incidentally, it allows the welded pipe to be conveyed away in direct line (or substantially such) longitudinally from the welding machine, and avoids the necessity otherwise present of changing twice the direction of progress of the material from the furnace, and of supplying the multiplied instrumentalities for carrying the lengths of pipe through such a devious course. In the embodiment of the invention shown in the accompanying drawings, these advantages flow directly, it will be observed, from the opening through the bar puller of a line of delivery.

It will be understood that our invention is not limited to details of structure; it is not, as we have incidentally indicated, limited to the presence of all the mechanical units described in exemplary manner above. In the ensuing claims we define what is essential to the invention, and if this be employed our invention will be present, regardless of specific details.

We claim as our invention:

1. In a pipe-welding mill, the combination of a furnace, a welding machine with its bar puller standing opposite the delivery opening from the furnace, and a conveyor for the welded pipe leading from the welding machine and bar puller in longitudinal continuation of the line of the advance of the pipe through the welding machine, substantially as described.

2. In a pipe-welding mill, the combination of a furnace, a welding machine standing opposite the delivery opening from the furnace, and including welding rolls and a bar puller standing at an interval from the welding rolls, said bar puller being ported, and a conveyor arranged to receive lengths of pipe as they come from the welding machine and to carry them longitudinally through the ported bar puller, substantially as described.

3. In a pipe-welding mill, the combination of a furnace, a welding machine standing opposite the delivery opening from the furnace and including welding rolls and a bar puller standing at an interval from the welding rolls, a tilting trough extending between welding rolls and bar puller, and a conveyor arranged beneath the trough and extending outwardly in longitudinal continuation thereof, substantially as described.

4. In a pipe-welding mill, the combination of a furnace, the hearth of which includes a table portion extending on one side to a gutter, means arranged at one end of the furnace for charging blanks to the table portion of the hearth, a welding machine arranged at the same end of the furnace with the means last mentioned, a pushout machine arranged at the opposite end of the furnace and opposite the gutter in the hearth thereof, and free standing space for attendants at the same end with and beside the pushout machine, substantially as described.

5. In a pipe-welding mill, the combination of a furnace, a charging machine and a welding machine standing side by side at one end of the furnace transversely of the furnace hearth, means for feeding blanks to the charging machine on the side thereof opposite the welding machine, a pushout machine standing at the opposite end of the furnace and directly opposite the welding machine, with free standing room for furnace attendants beside the pushout machine, the said welding machine including welding rolls and a bar puller arranged at an interval beyond the welding rolls and standing on a ported foundation, a tipping trough extending between welding rolls and bar puller, and a conveyor arranged beside said trough and at a lower level adapted to receive welded pipes from the trough and to convey them longitudinally through the ported foundation of the bar puller, substantially as described.

6. In a pipe-welding mill, the combination of a furnace having a twin hearth with lateral table portions and medial gutters, welding means arranged medially at one end of said furnace, charging means arranged at the same end of the furnace with the welding means and on either side thereof, the opposite end of the furnace being left free for manipulating the blanks within the furnace and for impelling them to the welding means, and a conveyor for the welded product, carrying it away longitudinally through a port formed in the machinery to admit of its passage, substantially as described.

7. In a pipe-welding mill, the combination of a furnace having a twin hearth with lateral table portions and medial gutters, welding means arranged medially at one end of said furnace, charging means arranged at the same end of the furnace with the welding means and on either side thereof, the opposite end of the furnace being left free for manipulating the blanks within the furnace and for impelling them to the welding means, and a conveyor for the welded product arranged adjacent the welding means and at a level lower than the line of progress of the material through the welding means, and adapted to carry the welded material away longitudinally from the furnace and the associated machine units named, substantially as described.

8. In a lap-weld pipe mill the combination of a furnace, two furnace-charging machines arranged at one end of said furnace and separated at an interval one from another, welding apparatus arranged at the same end of the furnace with, and between, said charging machines, and a conveyor for the welded pipe leading from the welding apparatus in longitudinal continuation of the line of advance of the pipe therethrough, substantially as described.

9. In a pipe mill the combination of a furnace, two furnace-charging machines arranged at one end of said furnace and separated at an interval one from another, welding apparatus including two tipping troughs arranged between said charging machines, and a conveyor arranged between said tipping troughs, substantially as described.

10. In pipe apparatus, a pair of welding troughs, means for tilting said troughs downwardly and inwardly, and pipe receiving means located below and between the two troughs and arranged to discharge in an endwise direction the pipes received from said troughs, substantially as described.

11. In pipe welding apparatus, the combination with a tiltable trough, of ball feeding mechanism arranged to discharge balls into said trough when the latter is in its normal untilted position, substantially as described.

12. In pipe welding apparatus, the combination with a tiltable trough, and means for tilting the same, of a ball feeding device arranged to discharge into said trough when in its normal untilted position, and means for operating said ball feeding apparatus in timed relation to the movements of said trough, substantially as described.

13. In pipe welding apparatus, the combination with a welding trough, of a ball feeding hopper, an upwardly extending spout into which said hopper discharges, and a plunger arranged to reciprocate in said spout, substantially as described.

14. In pipe welding apparatus, the combination with a tiltable welding trough, of a ball feeding hopper, and an upwardly extending spout into which said hopper discharges, and a plunger arranged to reciprocate in said spout, substantially as described.

In testimony whereof we have hereunto set our hands.

FRANK I. ELLIS.
JOHN H. SENNETT.

Witness:
FRANCIS J. TOMASSON.